(12) United States Patent
Jeong et al.

(10) Patent No.: US 7,561,359 B1
(45) Date of Patent: Jul. 14, 2009

(54) SPIRAL SERVO PATTERNS WITH ABSOLUTE REFERENCE POINT

(75) Inventors: Jay Jeong, Boulder, CO (US); Tim Everett, Niwot, CO (US); Stan Shepherd, Morgan Hill, CA (US)

(73) Assignee: Maxtor Corporation, Scotts Valley, CA (US)

( * ) Notice: Subject to any disclaimer, the term of this patent is extended or adjusted under 35 U.S.C. 154(b) by 416 days.

(21) Appl. No.: 10/859,061

(22) Filed: Jun. 2, 2004

Related U.S. Application Data (60) Provisional application No. 60/475,126, filed on Jun. 2, 2003.

(51) Int. Cl.
*G11B 5/09* (2006.01)
*G11B 5/596* (2006.01)
(52) U.S. Cl. .................................. 360/48; 360/77.08
(58) Field of Classification Search ................ None
See application file for complete search history.

(56) References Cited

U.S. PATENT DOCUMENTS

| | | | | |
|---|---|---|---|---|
| 4,587,579 A | * | 5/1986 | Cocke et al. ................ 360/75 |
| 4,796,098 A | * | 1/1989 | Giddings ..................... 360/15 |
| 4,873,679 A | * | 10/1989 | Murai et al. .................. 360/51 |
| 5,619,387 A | * | 4/1997 | Ottesen et al. ........... 360/77.08 |
| 6,035,351 A | * | 3/2000 | Billings et al. ................ 360/48 |
| 6,304,407 B1 | * | 10/2001 | Baker et al. ................... 360/75 |
| 6,356,401 B1 | * | 3/2002 | Bates et al. ................... 360/51 |
| 7,088,533 B1 | * | 8/2006 | Shepherd et al. ............. 360/51 |

* cited by examiner

*Primary Examiner*—Joseph H Feild
*Assistant Examiner*—Daniell L Negrón
(74) *Attorney, Agent, or Firm*—Fellers, Snider et al.

(57) ABSTRACT

The present invention is directed to a method and apparatus for providing an absolute reference point on a disk surface of a disk drive. A write head associated with the disk surface is used to write spirals of servo information thereon, for example, under control of a servo track writer. The spirals of servo information include standard spirals and special spirals. In one embodiment, the special spirals are shorter than the standard spirals and the special spirals are rotationally non-symmetric. For example, an unequal number of standard spirals are interposed between one pair of adjacent special spirals relative to the number of standard spirals interposed between other pairs of adjacent special spirals. The special spirals may take a variety of other forms to distinguish themselves from standard spirals.

29 Claims, 6 Drawing Sheets

SPIRAL SERVO PATTERNS WITH ABSOLUTE REFERENCE POINT

CROSS-REFERENCE TO RELATED APPLICATIONS

Priority is claimed from U.S. Provisional Patent Application Ser. No. 60/475,126 filed Jun. 2, 2003, which is incorporated herein by reference in its entirety.

FIELD OF THE INVENTION

The present invention relates generally to data storage devices, such as disk drives. More particularly, the present invention relates to a method and apparatus for providing an absolute reference point on a disk of a disk drive that has spiral servo patterns written thereon.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

Figure 1:
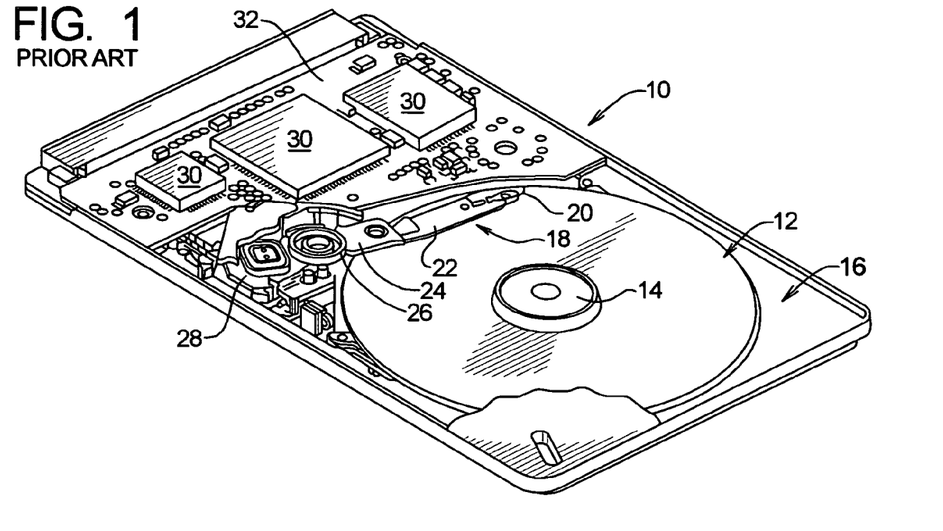
FIG. 1 is a diagrammatic representation illustrating a conventional disk drive with its top cover removed.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

Figure 2:
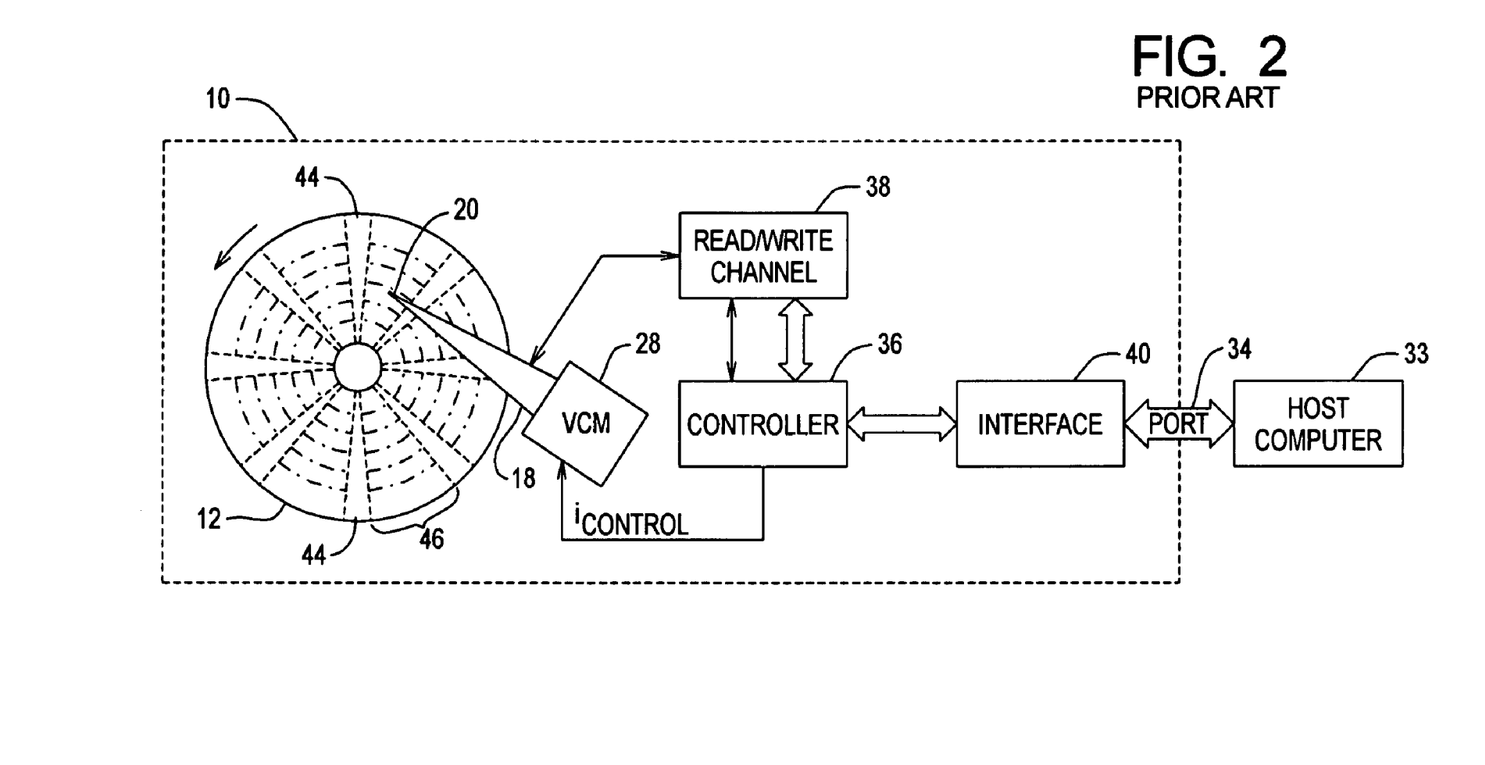
FIG. 2 is a functional block diagram which illustrates a conventional disk drive that is coupled to a host computer via an input/output port.

FIG. 2 is a functional block diagram which illustrates a conventional disk drive 10 that is coupled to a host computer 33 via an input/output port 34. The disk drive 10 is used by the host computer 33 as a data storage device. The host 33 delivers data access requests to the disk drive 10 via port 34. In addition, port 34 is used to transfer customer data between the disk drive 10 and the host 33 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 above a desired track of the disk 12 and sensing the magnetic polarity transitions stored within the track, as the track moves below the transducer 20. Similarly, data is "written" to the disk 12 by positioning the transducer 20 above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$, for example, in response to an access command received from the host computer 33 via the interface 40 or in response to servo information read from the disk surface 12.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 33 into a write current signal that is delivered to the transducer 20 to "write" the customer data to an appropriate portion of the disk 12. As will be discussed in greater detail, the read/write channel 38 is also operative for continually processing data read from servo information stored on the disk 12 and delivering the processed data to the controller 36 for use in, for example, transducer positioning.

Figure 3:
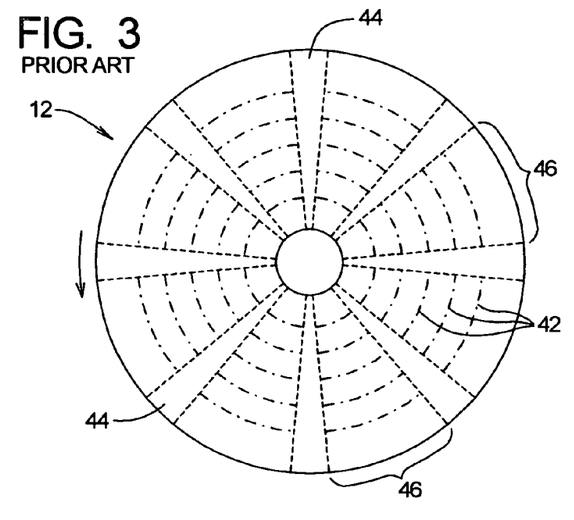
FIG. 3 is a diagrammatic representation of a top view of a magnetic storage disk illustrating a typical organization of data on a disk surface.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 (or wedges) that each cross the tracks 42 on the disk 12. The servo information in the servo spokes 44 is read by the transducer 20 during disk drive operation for use in positioning the transducer 20 above a desired track 42 of the disk 12. Among other things, the servo information includes a plurality of servo bursts (e.g., A, B, C and D bursts or the like) that are used to generate a Position Error Signal (PES) to position the write head relative to a track's centerline during a track following operation. The portions of the track between servo spokes 44 are used to store customer data received from, for example, the host computer 33 and are referred to as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of positioning the disk drive's write head at radial positions over the disk surface, so that servo information is written on the disk surface using the disk drive's write head with a high degree of positional accuracy.

In general, a STW is a very expensive piece of capital equipment. Thus, it is desirable that a STW be used as efficiently as possible during manufacturing operations. Even a small reduction in the amount of data needed to be written by the STW per disk surface can result in a significant cost and time savings.

A STW is used to write servo information, by controlling the position of the disk drive's write head, on a disk surface in a circumferential fashion at each radius at which the disk drive's write head is positioned. During drive operation, the servo information is used to position the transducer of the disk drive over the appropriate data track and data sector of the disk. Accordingly, as the number of tracks per inch (TPI) increases, the amount of time necessary to write servo information increases. That is, the number of circumferential passes that a STW must make over a disk surface increases as TPI increases. Thus, unless more STWs are supplied, manufacturing times will continually increase as the TPI increases.

Instead of using a STW to write servo information in a circumferential fashion at each radius, the assignee of the present invention presently uses a STW to write servo information in a spiral fashion (in at least some of its disk drives). Specifically, the STW moves the write head in a controlled manner (e.g., at a constant velocity or along a velocity profile) from the outer diameter of the disk to the inner diameter of the disk (or visa-versa) as the disk spins.

Figure 4:
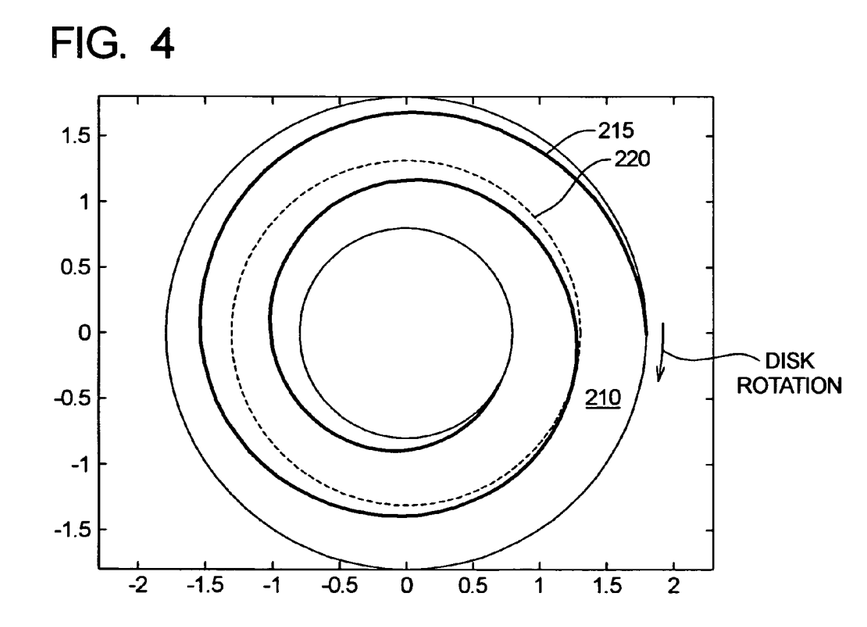
FIG. 4 is a diagrammatic representation of a disk surface having a spiral of servo information written thereon, along with a circular data storage track.

FIG. 4 is a diagrammatic representation of a disk surface 210 having a first spiral of servo information 215 written thereon. The dashed line, identified by reference numeral 220, represents a track. The first spiral of servo information 215 may make multiple revolutions around the disk surface 210 (roughly two revolutions as shown in FIG. 4), but only crosses track 220 once.

Figure 5:
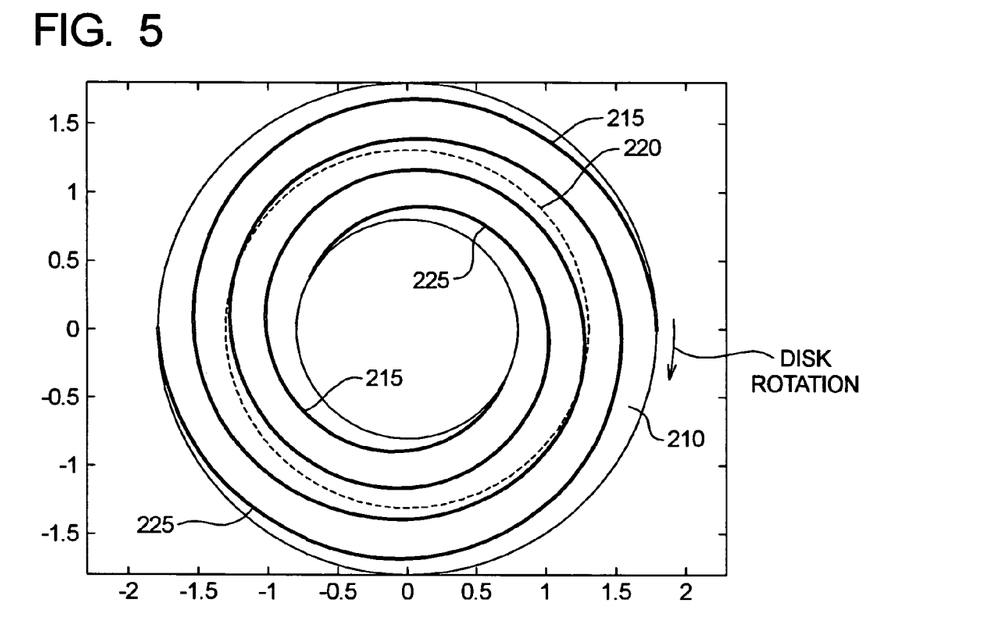
FIG. 5 is a diagrammatic representation of a disk surface having two spirals of servo information written thereon, along with a circular data storage track.

FIG. 5 is a diagrammatic representation of a disk surface 210 having a first spiral of servo information 215 and a second spiral of servo information 225 written thereon. As shown in FIG. 5, the first and second spirals 215, 225 are interlaced with one another and are written approximately 180 degrees apart. Again, each spiral crosses track 220 only once.

Additional spirals of servo information may be written on the disk surface 210 depending upon the servo sample rate (that is, the number of servo samples required for each track 220 to keep the disk drive's transducer sufficiently on-track). For example, if a servo sample rate of 120 equally-spaced servo sectors per track was required, 120 equally-spaced spirals would be written on the disk surface 210. Accordingly, by writing servo information in a spiral fashion, the time necessary to write servo information on disk surface 210 using the STW is a function of the servo sample rate (i.e., the number of spirals of servo information to be written) rather than the number of tracks.

Referring again to FIGS. 4 and 5, the spirals of servo information are written by moving the disk drive's write head using the STW in a generally radial direction (more accurately, in a radial direction along an arc due to the position of the bearing assembly), while both the disk is spinning and the write head is enabled. The direction of disk rotation is indicated by an arrow as shown in each of FIGS. 4 and 5.

The disk drive's write head is enabled for nearly its entire stroke (i.e., from the outer diameter to the inner diameter or visa-versa) while under the control of the STW. As a result, a continuous spiral of servo information is written.

Each of the spirals of servo information includes sync marks written at fixed time intervals by the disk drive's write head. As mentioned above, the STW is used to move the disk drive's write head at some fixed velocity (or velocity profile) in a generally radial direction across the disk surface. If the time interval between sync marks is known and the velocity of the disk drive's write head is known, the equivalent distance between sync marks in the radial direction can be determined. Specifically, the following formula may be applied: Distance=(Velocity)(Time), where Distance represents the distance between sync marks, Velocity represents the radial velocity of the disk drive's write head (under control of the STW) and Time represents the interval between sync marks.

For example, the interval between sync marks may be set at 1 microsecond, while the write head may be controlled to move at a velocity of 10 inches per second along its stroke. Thus, the distance between sync marks can be calculated to be 10 microinches (radially) along each spiral.

Each point along a given spiral corresponds to a unique radius. Accordingly, the spirals may be used to accurately position a transducer of a disk drive over the disk surface. (The sync marks are useful for ensuring against a loss-of-alignment between information in the spiral and a disk-locked clock.)

Spiral patterns and their sync marks may be written in a variety of different forms. In one prior system, the spiral patterns are continuous, single-frequency patterns having sync marks embedded therein. The sync marks constitute phase shifts within the spiral pattern.

The assignee of the present invention has developed a technique for writing spirals of servo information using a STW, but then writing final servo patterns (which look like the conventional patterns shown in FIG. 3) using the disk drive itself. That is, using the spirals of servo information, the disk drive performs a self-servo writing operation, so that its disks are formatted in a fashion that is substantially identical to disks that are formatted using a STW. In order to obtain an absolute reference point (both a radial and circumferential reference point) on the disk surface using the aforementioned technique, the STW is used in conjunction with the disk drive's write head to write a small band of conventional servo sectors on the disk surface. The conventional servo sectors include radial and angular information digitally encoded therein.

Figure 6:
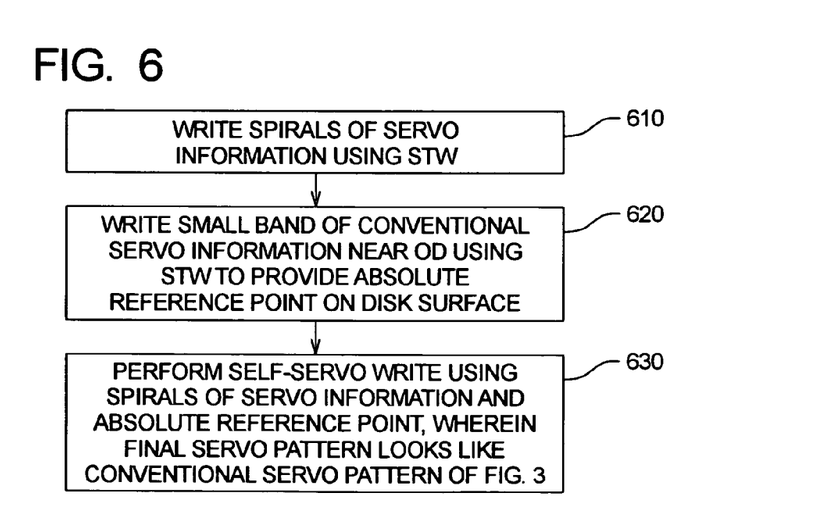
FIG. 6 is a flowchart illustrating a method of self-servo writing a final servo pattern on a disk surface, wherein spirals of servo information are written on the disk surface using a STW and wherein a small band of conventional servo information is written by the STW to provide an absolute reference point on the disk surface that is used during the self-servo writing process.

As shown in FIG. 6, the STW, by guiding the disk drive's write head, is used to write spirals of servo information on the disk surface (step 610). Once the spirals of servo information have been written, the STW is used to write a small band of conventional servo information on the disk surface (near the outer diameter, for example) to provide an absolute reference point on the disk surface (step 620). Then, the disk drive performs a self-servo write operation (i.e., without using the STW) using the spirals of servo information and the absolute reference point (provided by the small band of conventional servo information) to generate a final servo pattern, so that the servo information looks like that of a conventionally-formatted disk (e.g., like that of FIG. 3) (step 630).

Because the STW is used in conjunction with the disk drive's write head to write both spirals of servo information and small bands of conventional servo information, the design of the STW becomes quite complex. Accordingly, it would be desirable to develop a method for providing an absolute reference point on the disk surface without using the STW to write any conventional servo sectors, so that the design of the STW can be simplified. That is, it would be desirable to develop a method for providing an absolute reference point on the disk surface using only spirals of servo information.

SUMMARY OF THE INVENTION

Various embodiments of the present invention are generally directed to the writing of spiral servo patterns on a disk surface to define an absolute reference point on the surface.

In accordance with some embodiments, a method generally comprises providing a disk surface and a write head associated with the disk surface, and writing spirals of servo information onto the disk surface using the write head. The spirals of servo information curvilinearly extend across the disk surface and comprise standard spirals and a special spiral, the special spiral defining a radially distinct and circumferentially distinct reference point on the disk surface.

In accordance with other embodiments, an apparatus generally comprises a data transducing head, and a disk surface comprising spirals of servo information written to said disk surface by the head. The spirals comprise a plurality of standard spirals and at least one special spiral each of which curvilinearly extends across the disk surface, and the at least one special spiral defines an absolute radial reference point on the disk surface.

DETAILED DESCRIPTION OF THE PREFERRED EMBODIMENT

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The present invention is directed to a method for providing an absolute reference point on a disk of a disk drive that has spirals of servo information written thereon. A simplified representation of one embodiment of the invention is shown in FIG. 7.

The disk surface 710 has spirals of servo information written thereon, wherein some of the spirals of servo information are standard spirals 720 and some are special spirals 730A, 730B and 730C. The special spirals 730A-730C are used to provide an absolute reference position on the disk surface 710 in both the radial and circumferential sense.

Figure 7:
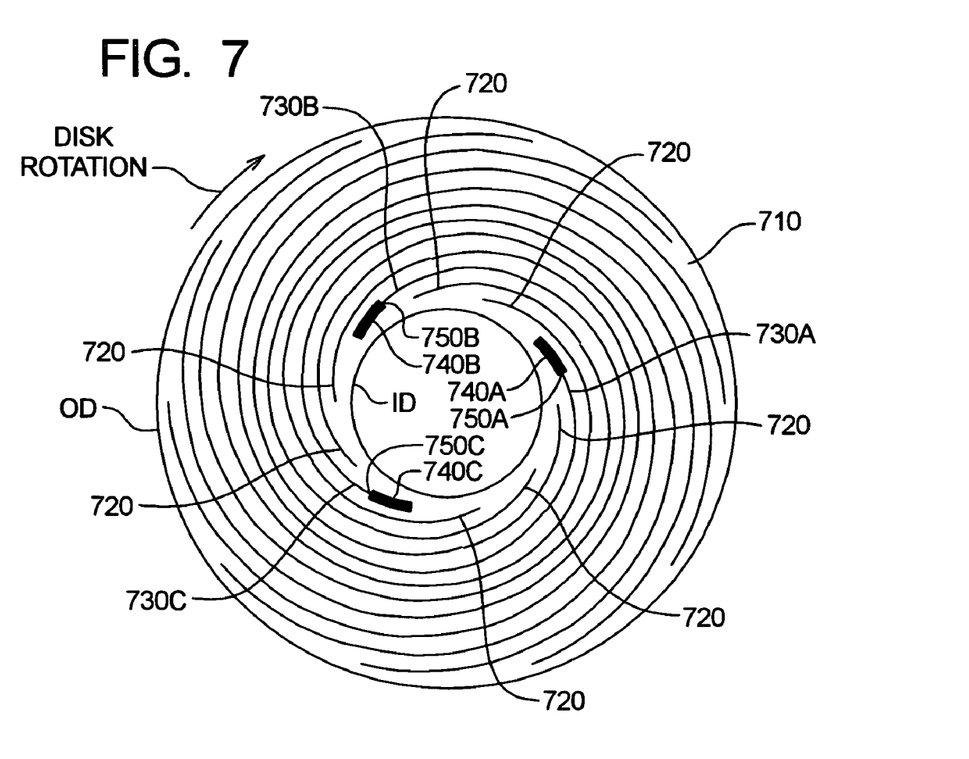
FIG. 7 is simplified diagrammatic representation of a disk surface having spirals of servo information thereon, wherein the spirals of servo information provide an absolute reference point on the disk surface in accordance with one embodiment of the present invention; and, FIG. 8 is a flowchart illustrating a method of locating an absolute reference point on a disk surface.

Specifically, in the embodiment shown in FIG. 7, the special spirals 730A-730C are shorter than the standard spirals 720, as indicated by the dark segments 740A-740C (which show missing segments of the special spirals). By locating one or more of the ends 750A-750C of the special spirals 730A-730C, a radial reference position may be determined.

FIG. 7 also shows that the special spirals 730A-730C, when moving counterclockwise from dark segment 740A, are separated by two, two and three standard spirals 720. More specifically, there are two standard spirals 720 between special spiral 730A and special spiral 730B. Also, there are two standard spirals 720 between special spiral 730B and special spiral 730C. However, there are three standard spirals 720 between special spiral 730C and special spiral 730A. Accordingly, by locating where a change occurs in the number standard spirals between special spirals, a circumferential reference position may be determined.

The combination of the radial reference position and circumferential reference position gives an absolute reference point on the disk surface. By providing an absolute reference point on the disk surface, the STW can be simplified in that it need not be required to write a small band of conventional servo information on the disk surface to provide such absolute reference point. Instead, the absolute reference position from the spirals of servo information may be used to write final servo patterns (that look like the conventional servo patterns of FIG. 3) in the absence of the STW writing small bands of conventional servo information on the disk surface.

In order to write special spirals, the write head is moved under control of the STW just as if writing standard spirals. However, the write head is simply inhibited from writing for a predetermined period of time associated with the length that the special spiral is to be shortened.

It should be understood that a much greater number of spirals will be written on a disk surface than that shown in FIG. 7. Accordingly, FIG. 7 is a simplified representation of the present invention. Stated more genericaly, in one embodiment, an absolute reference point on the disk surface may be provided by writing a small, rotationally non-symmetric subset of spirals, which are truncated at the time of spiral-writing.

Figure 8:
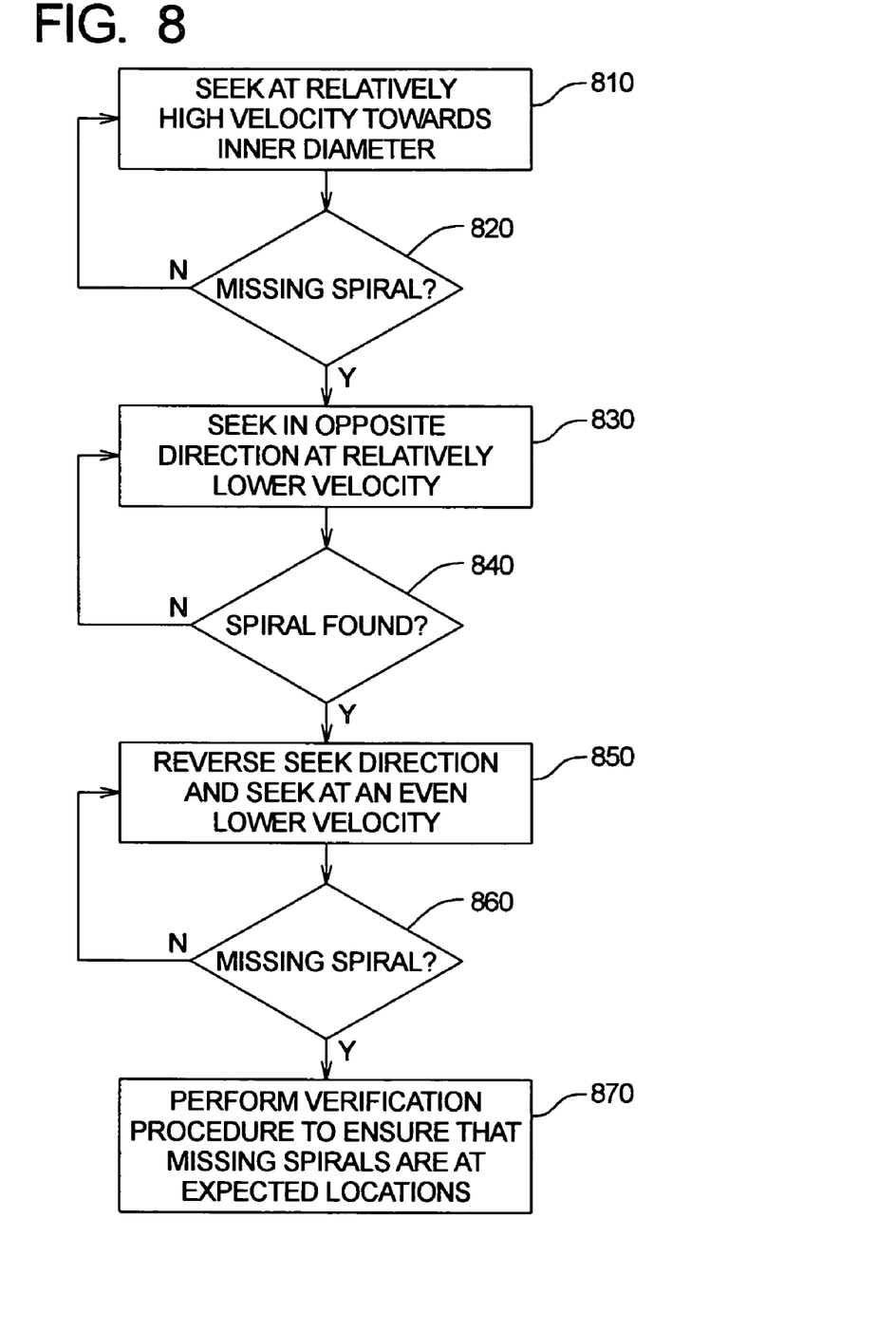

FIG. 8 is a flowchart which illustrates one method of locating the absolute reference point on the disk surface (e.g., for the embodiment shown in FIG. 7). A seek operation is performed at a relatively high velocity towards the inner diameter (ID) of the disk (step 810). Because the spirals of servo information have been placed on the disk surface in a known relationship in position (and, hence, in time) relative to one another, a determination is made as to whether a spiral of servo information is missing from a time it is expect to be seen (step 820).

If a spiral is missing, an initial assumption is made that the read head has passed the end of at least the special spiral. Then, the seek direction is reversed (e.g., towards the outer diameter (OD)) and the seek operation is performed at a relatively lower velocity (step 830) than the velocity of the initial seek operation towards the ID of step 810. The seek operation is performed until a spiral is read (step 840).

Once a spiral is read, the seek direction is again reversed (e.g., towards the ID) and the seek operation is performed at an even lower velocity than the prior seek operations (step 850), until the spirals are missing again (step 860). Finally, in step 870, a verification procedure is performed to ensure that the missing spirals occur at appropriate circumferential locations about the disk surface (or, equivalently, at appropriate times relative to one another). This is done in order to guard against situations where some portion of a spiral is missing caused by media defects, high fly writing, or some other error. Accordingly, an absolute reference point (both in the radial and circumferential sense) is determined.

It should be understood that the present invention is not limited to the special spirals described in connected with FIGS. 7 and 8. For example, instead of providing a plurality of special spirals that are shorter than standard spirals, a single special spiral (which is shorter than standard spirals) may be used. The inventors recognize, however, that the robustness of the system may be reduced due to, for example, missing spiral information due to media defects and the like. Accordingly, it is preferable to locate at least two missing spirals to determine an absolute radial position.

In some embodiments, one or more special spirals may include different features from standard spirals, so as to provide an absolute circumferential position. For example, if a standard spiral includes a continuous, single frequency pattern with sync marks embedded therein, then a special spiral may include the continuous, single frequency pattern without sync marks.

In another embodiment, the standard spirals include a continuous, single frequency pattern with sync marks embedded therein and the synch marks have a polarity in a first direction. In such embodiment, the special spiral includes the continuous, single frequency pattern with sync marks having a polarity which is inverted relative to the sync marks in the standard spirals (for the entire length or just a portion of the special spiral).

In yet another embodiment, instead of the special spirals being shortened relative to the standard spirals, the special spirals may be interrupted (i.e., they may contain a discontinuity). That is, at a predetermined time (and, hence, location) while the special spiral is being written, the write head is inhibited for a short period of time, so that a gap exists along the spiral.

In a further embodiment, instead of the special spirals being shortened relative to the standard spirals, the special spirals are longer than the standard spirals. In such case, the write head would be inhibited for a predetermined period of time when writing standard spirals (e.g., near their ends), but would be allowed to write across the entire stroke for special spirals.

In another embodiment, special spirals could be written using the write head in the absence of a STW. That is, the special spirals could be written by the write head in an open-loop fashion.

It should be understood that instead of the special spirals being shortened (or lengthened) at a location near the inner diameter of the disk surface, the special spirals may be shortened at a location near the outer diameter of the disk surface.

It should also be understood that a combination of the aforementioned special spirals may be used. For example, one can imagine a condition where one or more special spirals are shortened relative to standard spirals and where the same, or other, special spirals are interrupted.

As mentioned above, FIG. 7 is a simplified representation of the present invention. In a more realistic example of the present invention, 192 spirals are written onto the disk surface, wherein 4 of the 192 spirals are special spirals and wherein the special spirals are shorter than standard spirals. In such case, three sets of 49 standard spirals are interposed between special spirals and one set of 41 standard spirals is interposed between special spirals (49-49-49-41 as compared to 2-2-3 in FIG. 7).

In some cases it may be beneficial to write twice the number of spirals (2×spirals) as compared to the total number of final servo sectors, so as to avoid overwriting spirals of servo information during the self-servo writing process. The spirals are divided into an odd set of spirals and an even set of spirals. In such case, corresponding pairs of special spirals are shortened. Accordingly, regardless of whether the disk drive is servoing on the odd set of spirals or the even set of spirals, a radial reference can be determined.

It should be noted that, by using special spirals that are shorter than standard spirals, the write head may be "flying blind" during the self-servo writing process where the spiral of servo information is "missing." Despite this apparent drawback, a larger number of special spirals may increase the robustness of the system when attempting to locate the absolute reference point. In addition, a larger number of special spirals may aid in locating the radial reference point by reducing the overshoot when seeking for missing spiral servo information (see FIG. 8). Accordingly, a balance should be reached when selecting the number of shortened special spirals to be used.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
   providing a disk surface and a write head associated with the disk surface; and
   writing spirals of servo information onto the disk surface using the write head, wherein said spirals of servo information curvilinearly extend across the disk surface and comprise standard spirals of a first length and a special spiral of a different, second length, said special spiral defining a radially distinct and circumferentially distinct reference point on the disk surface.

2. The method of claim 1, wherein movement of the write head is controlled by a servo track writer (STW).

3. The method of claim 1, wherein said special spiral is shorter than said standard spirals, and wherein the radially distinct and circumferentially distinct reference point is aligned with a selected end of the special spiral.

4. The method of claim 1, wherein said special spiral includes a discontinuity.

5. The method of claim 4, wherein said discontinuity is formed by preventing the write head from writing onto the disk surface for a short period of time while the special spiral is being written.

6. The method of claim 4, wherein the radially distinct and circumferentially distinct reference point is aligned with the discontinuity.

7. The method of claim 1, further comprising:
   detecting said reference point; and
   using the head to self-servo write final servo data to the disc surface in relation to the detected reference point.

8. The method of claim 7, wherein the detecting step comprises locating the special spiral by seeking the head in a first direction, then in a direction opposite to said first direction and then again in the first direction.

9. The method of claim 1, wherein the special spiral of the writing step comprises a first special spiral, wherein the spirals of servo information further comprise a second special spiral, and wherein the first and second special spirals define a radially distinct reference point on the disk surface.

10. The method of claim 9, wherein said first and second special spirals are shorter than said standard spirals.

11. The method of claim 9, wherein the radially distinct reference point defined by the first and second special spirals is located by seeking in a first direction, then in a direction opposite to said first direction and then again in the first direction.

12. The method of claim 9 wherein the spirals of servo information further comprise a plurality of special spirals, wherein an unequal number of standard spirals are interposed between one pair of adjacent special spirals from the plurality of special spirals relative to the number of standard spirals interposed between other pairs of adjacent special spirals from the plurality of special spirals.

13. The method of claim 1, wherein the first and second special spirals have a common length different than a common length of the standard spirals, and wherein the first and second spirals terminate at the radially distinct reference point on the disk surface.

14. An apparatus comprising:
a disk surface comprising spirals of servo information written to said disk surface, the spirals comprising a plurality of standard spirals each of which curvilinearly extends across the disk surface from a first radius to a second radius and at least one special spiral that terminates at a different, third radius to define an absolute radial reference point on the disk surface.

15. The apparatus of claim 14, wherein the at least one special spiral is shorter than each of the plurality of standard spirals.

16. The apparatus of claim 14, wherein the first radius comprises a first radial location adjacent an outermost radius of the disk surface and the second radius comprises a second radial location adjacent an innermost radius of the disk surface.

17. The apparatus of claim 16, wherein the absolute radial reference point is disposed between the first and second radial locations.

18. The apparatus of claim 14, wherein the at least one special spiral comprises a plurality of special spirals interlaced with the plurality of standard spirals.

19. The apparatus of claim 18, wherein an unequal number of the plurality of standard spirals are interposed between one pair of adjacent ones of the plurality of special spirals relative to the number of the plurality of standard spirals interposed between other pairs of adjacent ones of the plurality of special spirals.

20. The apparatus of claim 14, wherein a selected end of the at least one special spiral terminates at said third radius, and wherein an opposing end of the at least one special spiral terminates at a selected one of the first radius or the second radius.

21. The apparatus of claim 14, wherein each of the plurality of standard spirals comprises a first selected pattern, and wherein the at least one special spiral comprises a second selected pattern that is inverted with respect to the first selected pattern.

22. The apparatus of claim 14, wherein the disk surface further comprises final servo data written by the head that circumferentially arrayed around the disk surface at a selected radius, said final servo data written using the absolute radial reference point as a positional reference.

23. The apparatus of claim 14, further comprising a head adjacent the disk surface, wherein the spirals of servo information are written by the head.

24. The apparatus of claim 23, further comprising a controller configured to direct the head to write the spirals of servo information to the disk surface.

25. An apparatus, comprising:
a disk surface comprising spirals of servo information which curvilinearly extend across the disk surface, the spirals comprising a plurality of standard spirals each with a first pattern and a special spiral having a second pattern different from the first pattern, the special spiral defining an absolute radial reference point on the disk surface, wherein the first pattern comprises embedded sync marks and wherein the second pattern does not include embedded sync marks.

26. The apparatus of claim 25, wherein the sync marks of the special spiral having a first polarity relative to the sync marks of the standard spirals having a second polarity the entire length of the special spiral.

27. The apparatus of claim 25, wherein the plurality of standard spirals and the special spiral each extend from a first radius to a second radius on the disk surface.

28. A method comprising:
using a write head to write spirals of servo information that curvilinearly extend across a disc surface, said spirals of servo information comprising standard spirals having a first pattern and a special spiral having a second pattern different from the first pattern, the special spiral defining an absolute radial reference point on the disk surface, wherein the sync marks of the special spiral are inverted relative to the sync marks of the standard spirals for substantially the entire length of the special spiral.

29. The method of claim 28, wherein the plurality of standard spirals and the special spiral each extend from a first radius to a second radius on the disk surface.

* * * * *